(12) United States Patent
Lu et al.

(10) Patent No.: US 9,848,361 B2
(45) Date of Patent: Dec. 19, 2017

(54) METHODS USED IN CLUSTER MANAGER, RADIO NODE AND CONTROL NODE, AND ASSOCIATED DEVICES

(71) Applicant: Telefonaktiebolaget L M Ericsson (publ), Stockholm (SE)

(72) Inventors: Qianxi Lu, Beijing (CN); Rui Fan, Beijing (CN); Qingyu Miao, Beijing (CN); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 150 days.

(21) Appl. No.: 14/650,539

(22) PCT Filed: Jun. 1, 2015

(86) PCT No.: PCT/CN2015/080489
§ 371 (c)(1),
(2) Date: Jun. 8, 2015

(87) PCT Pub. No.: WO2016/192006
PCT Pub. Date: Dec. 8, 2016

(65) Prior Publication Data
US 2017/0142621 A1 May 18, 2017

(51) Int. Cl.
*H04W 36/08* (2009.01)
*H04W 36/30* (2009.01)
*H04W 36/00* (2009.01)

(52) U.S. Cl.
CPC ....... *H04W 36/0094* (2013.01); *H04W 36/08* (2013.01); *H04W 36/30* (2013.01)

(58) Field of Classification Search
CPC .. H04W 36/0094; H04W 36/08; H04W 36/30
See application file for complete search history.

(56) References Cited

U.S. PATENT DOCUMENTS 6,438,377 B1 * 8/2002 Savolainen ........... H04W 36/30
370/332
2004/0023693 A1 * 2/2004 Okawa .................. H04W 36/12
455/562.1

(Continued)

FOREIGN PATENT DOCUMENTS

| CN | 1166260 A | 11/1997 |
|----|-----------|---------|
| WO | 2014116265 A1 | 7/2014 |
| WO | 2014134831 A1 | 9/2014 |

OTHER PUBLICATIONS

International Search Report and the Written Opinion for Application No. PCT/CN2015/080489, dated Mar. 1, 2016, 12 pages.

(Continued)

*Primary Examiner* — Kamran Afshar
*Assistant Examiner* — Minjung Kim
(74) *Attorney, Agent, or Firm* — Nicholson De Vos Webster & Elliott LLP

(57) ABSTRACT

The present disclosure relates to a method used in a cluster manager controlling a cluster for a terminal device served by a radio node, and to the associated cluster manager. The cluster manager is under control of a control node and the cluster includes the radio node. The method includes: receiving Layer 1 (L1)/Layer 2 (L2) measurements of the terminal device on the radio node and one or more neighboring radio nodes of the radio node; determining a target radio node, to which the terminal device is to be handed over, based on the L1/L2 measurements; determining whether the target radio node is within the cluster; and if it is determined that the target radio node is within the cluster, determining whether the terminal device is to perform handover from a beam of the radio node to a beam of the target radio node.

10 Claims, 12 Drawing Sheets

(56) References Cited

U.S. PATENT DOCUMENTS

| | | | | |
|---|---|---|---|---|
| 2005/0197155 A1* | 9/2005 | Baker | ............... | H04M 15/00 |
| | | | | 455/552.1 |
| 2010/0142405 A1* | 6/2010 | Cai | .................. | H04W 36/30 |
| | | | | 370/254 |
| 2012/0252462 A1* | 10/2012 | Fahldieck | ............ | H04W 36/32 |
| | | | | 455/438 |
| 2013/0077494 A1* | 3/2013 | Samdanis | ............ | H04B 7/155 |
| | | | | 370/235 |
| 2013/0225189 A1* | 8/2013 | Moon | ............... | H04W 72/042 |
| | | | | 455/452.1 |

OTHER PUBLICATIONS

"3rd Generation Partnership Project;Technical Specification Group Radio Access Network; Services provided by the physical layer (Release 11)," 3GPP TS 25.302 V11.4.0, (Jun. 2013), pp. 1-102.

"3rd Generation Partnership Project; Technical Specification Group Radio Access Network; Radio Resource Control (RRC); Protocol specification (Release 11)," 3GPP TS 25.331 V11.7.0, (Sep. 2013), pp. 1-2085.

"3rd Generation Partnership Project; Technical Specification Group Radio Access Network; Radio resource management strategies (Release 7)," 3GPP TR 25.922 V7.1.0, (Mar. 2007), pp. 1-95.

* cited by examiner

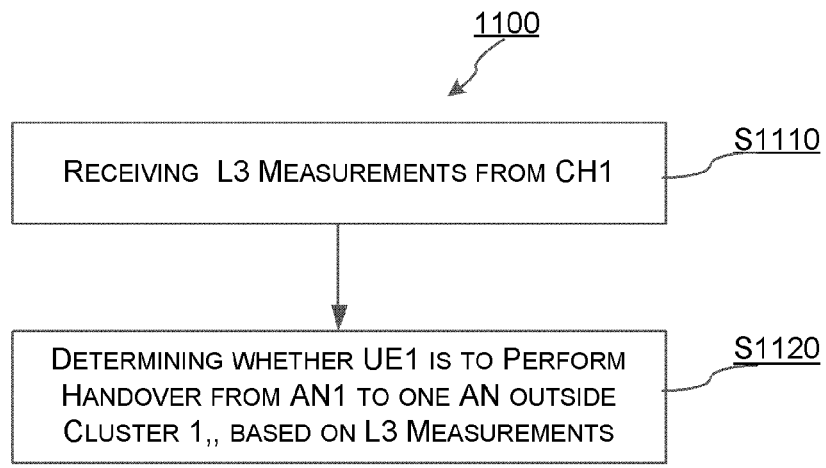
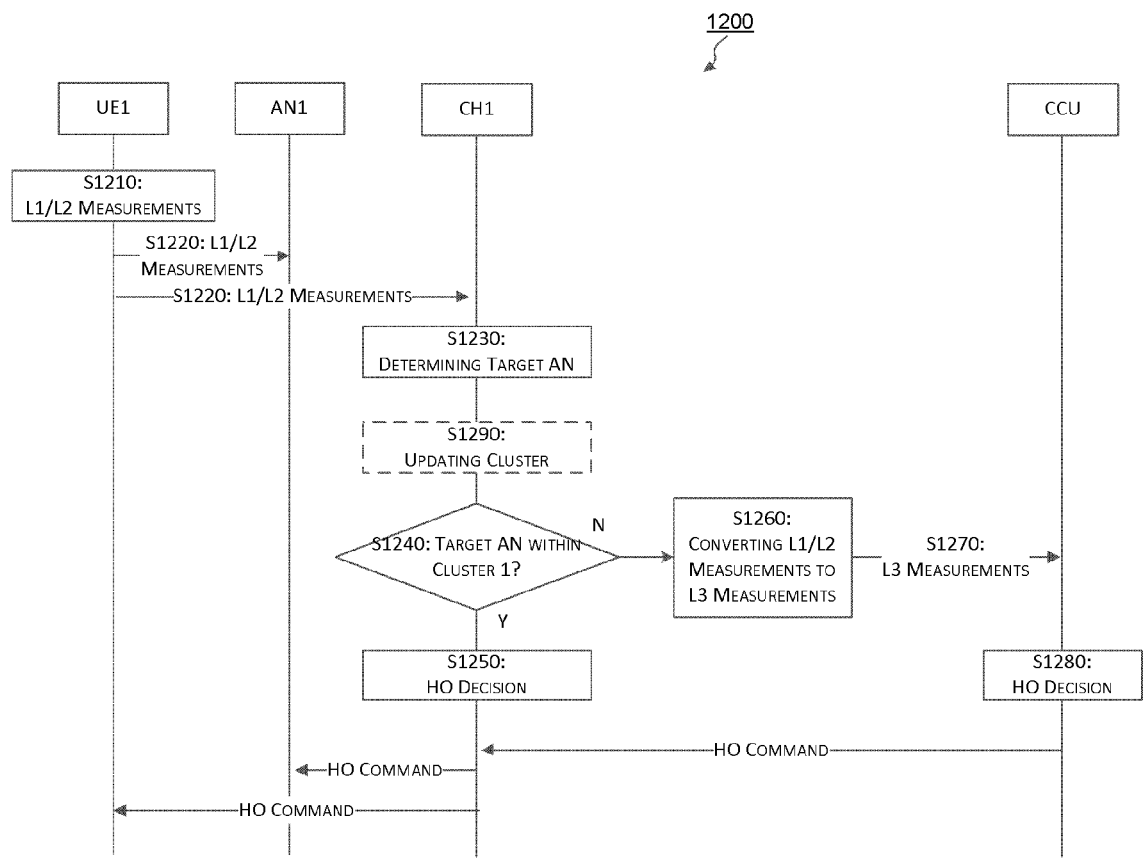

Fig. 16A

CONTROL NODE
1600

| RECEIVING UNIT 1610 | DETERMINING UNIT 1620 |

Fig. 16B

CONTROL NODE
1600

| PROCESSOR 1601 | MEMORY 1602 |

Fig. 16C

CONTROL NODE
1600

PROCESSING ARRANGEMENT
1603

METHODS USED IN CLUSTER MANAGER, RADIO NODE AND CONTROL NODE, AND ASSOCIATED DEVICES

CROSS-REFERENCE TO RELATED APPLICATIONS

This application is a National stage of International Application No. PCT/CN2015/080489, filed Jun. 1, 2015, which is hereby incorporated by reference.

TECHNICAL FIELD

The present disclosure generally relates to the technical field of wireless communications, and particularly, to a method implemented used in a cluster manager and the associated cluster manager, to a method used in a radio node and the associated radio node, and to a method used in a control node and the associated control node.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

The ultimate goal of mobile broadband should be the ubiquitous and sustainable provision of non-limiting data rates to everyone and everything at every time. Ultra-Dense Networks (UDN) is an important next step following the successful introduction of Long-Term Evolution (LTE) for wide-area and local-area access (referring to "3GPP TS 25.302: "Services provided by the Physical Layer"). One example of UDN is a MilliMeter-Wave (MMW) Radio Access Technology (RAT) network.

FIG. 1 schematically shows one example MMW RAT network. As shown in FIG. 1, there is a network node or a control node called as Central Control Unit (CCU), which is responsible for parameter configurations and coordination among Access Points (APs) or Access Nodes (ANs), e.g., AN1, AN2, AN3, and AN4, or any other radio nodes that enable of covering a certain geographical area. Each AN can serve one or more communication devices, such as User Equipments (UE), operating in the wireless communication networks or systems, also known as e.g. wireless terminals, mobile terminals and/or mobile stations, referred to as terminal devices hereafter. For example, AN1 serves UE1, and AN2 serves UE2, etc.

Even though only a local-area access technology, UDN can be deployed in areas with high traffic consumption and thus provide an important step towards the above goal. Through overprovision and the related low average loads in the access network, UDN can create ubiquitous access opportunities, which provide users with the desired data rates even under realistic assumption on user density and traffic. Overprovision is achieved by an extremely dense grid of ANs, e.g., as illustrated in FIG. 1. Inter-AN distances in the order of tens of meters and even below are envisioned in indoor deployments where one or even multiple ANs are conceivable in each room. In addition to the increased network capacity, densification—via reduced transmit powers—also offers access to vast spectrum holdings in the MMW bands and thus increased data rates.

For example, several GHz of spectrum is available in the unlimited 60 GHz band and potentially more in other millimeter-wave bands enabling multi-Gb/s transmissions even with technologies providing moderate spectral efficiency. While maybe perceived as old-fashioned, schemes with moderate spectral efficiencies offer robustness and energy efficient data transmission. Furthermore, there are also implementation issues at higher MMW frequencies that make it very challenging to provide very high spectral efficiency (in b/s/Hz). In this sense, one can trade spectral efficiency for bandwidth.

FIG. 2 shows the traditional handover procedure in LTE. As shown in FIG. 2, the handover procedure consists of the following steps:

Initially, UE needs to perform measures on both its serving cell and one or more neighboring cells. For example, UE may measure signal strengths from these cells. Once measurement results meet a handover criterion for more than a Time-to-Trigger (TTT) duration, Event A3 is triggered (referring to "LTE—The UMTS Long Term Evolution From Theory to Practice").

If Event A3 is triggered, measurement reports can be sent from UE to its source eNB corresponding to the serving cell.

When source eNB receives the measurement reports, source eNB can select the right target eNB and then exchange handover related information with the selected target eNB.

Then, source eNB can send Handover (HO) Command to UE and ask UE to do handover.

Finally, UE initiates random access to the target cell and finally sends Handover Complete to target cell.

For UE mobility within an MMW-RAT network, the traditional handover procedure as shown in FIG. 2 is not suitable as source AN (also referring to as serving AN) needs to know the neighborhood relationship with target AN and needs to forward both context information and packets toward target AN. This means quite a lot burden and overhead on each AN. Instead, it has been proposed that the mobility management is controlled by a Network Controller (NC). As NC is the CCU in the mmW network, it knows the network topology very well. NC could know which other neighbor AN may need to serve the UE when it connects with one serving AN.

FIG. 3 shows the mobility procedure in MMW-RAT network.

As shown in FIG. 3, when a UE connects with a source AN, it will report measurement results to the NC. Then the NC can determine if another AN nearby the source AN needs be prepared to serve the UE or not, and if the UE need to switch to the target AN or not. If the UE needs to switch to the target AN, different from the traditional handover, the source AN is not required to transfer the UE context to the target AN, and forward packets toward the target AN. Instead, the target AN obtains the necessary context information from either the UE or from the NC. The information to be acquired from the UE can be UE network capability, the packet status information, UE historical information, etc. The information to be acquired from the NC can be the bearer or Quality of Service (QoS) related information. Since the security is between UE and Local-GateWay (L-GW)/NC, neither the source AN nor the target AN needs to care about this issue, like they would in traditional handover.

A UE-specific serving cluster (SvC) is a group of ANs that are located in the vicinity of a UE and are ready to serve the UE. To control fast beam switch, a cluster head (CH, also called as a cluster manager) is needed for coordination in the cluster. Cluster head might not be located in different nodes, so the cluster head concept can be used in the structures of different backhauls. For wired backhaul, if it is centralized coordination, cluster head is located in the CCU. If it is distributed coordination, cluster head is located with one AN (in this case, it is the definition of P-SAN). For wireless self backhaul, cluster head's location depends on the topology of the cluster. It may or may not be a P-SAN depending on topology and UE position. Besides the coordination of beam switch, cluster head handles the majority of data to be sent to and to be received from the UE. For wireless self-backhaul, in order that the cluster head can coordinate the inter-AN beam switch fast, it is assumed that there is only one hop between cluster head and ANs in the cluster.

FIG. 4 illustrates an exemplary deployment of the MMW-RAT system. As shown in FIG. 4, (AN1, AN2 and AN3) can be in one cluster (Cluster 1), (AN3, AN4 and AN5) can be in one cluster (Cluster 2). Apparently, AN1 serves a cluster head of Cluster 1, and AN3 serves a cluster head of Cluster 2. AN2 and AN4 cannot be in one cluster because there are more than one hops between AN2 and AN4.

Typically, measurement reports obtained by UE are Layer 1 (L1)/Layer 2 (L2) measurements. However, as illustrated in FIG. 2 or FIG. 3, no matter during the traditional handover procedure in LTE or during the mobility procedure in MMW-RAT network, it is Layer 3 (L3) measurements to be sent by UE to source eNB/NC. Therefore, UE has to convert L1/L2 measurements to L3 measurements in advance. In other words, UE has to perform post-processing of L1/L2 measurements to get L3 measurements, and then send L3 measurements to source eNB/NC for corresponding mobility procedure.

SUMMARY

It is in view of at least one of the above considerations and others that the various embodiments of the present technology have been made. To be specific, the present disclosure proposes to perform post-processing of a measurement report from a UE, at a radio node serving the UE or a cluster manager of the UE.

According to a first aspect of the present disclosure, there is provided a method used in a cluster manager controlling a cluster for a terminal device served by a radio node. The cluster manager is under control of a control node and the cluster includes the radio node. The method includes: receiving L1/L2 measurements of the terminal device on the radio node and one or more neighboring radio nodes of the radio node; determining a target radio node, to which the terminal device is to be handed over, based on the L1/L2 measurements; determining whether the target radio node is within the cluster; and if it is determined that the target radio node is within the cluster, determining whether the terminal device is to perform handover from a beam of the radio node to a beam of the target radio node.

In an embodiment, the method further includes: if it is determined that the target radio node is outside the cluster, converting the L1/L2 measurements to Layer 3 (L3) measurements; and transmitting the L3 measurements to the control node for determining whether the terminal device is to perform handover from the radio node to the target radio node.

In an embodiment, before determining whether the target radio node is within the cluster, the method further includes: updating the cluster based on the L1/L2 measurements.

In an embodiment, updating the cluster based on the L1/L2 measurements includes: converting the L1/L2 measurements to L3 measurements; determining that one or more radio nodes outside the cluster have been measured as having a signal quality above a first predefined threshold, based on the L3 measurements; and adding the one or more radio node into the cluster.

In an embodiment, updating the cluster based on the L1/L2 measurements includes: converting the L1/L2 measurements to L3 measurements; determining that one or more radio nodes within the cluster have been measured as having a signal quality below a second predefined threshold, based on the L3 measurements; and removing the detected one or more radio nodes from the cluster.

According to a second aspect of the present disclosure, there is provided a method used in a radio node. The radio node is under control of a control node and serving a terminal device. The method includes: receiving, from the terminal device, L1/L2 measurements on the radio node and one or more neighboring radio nodes of the radio node; converting the L1/L2 measurements to L3 measurements; and transmitting the L3 measurements to the control node for determining whether the terminal device is to perform handover from the radio node to one neighboring radio node of the radio node.

According to a third aspect of the present disclosure, there is provided a method used in a control node. The control node controls a radio node serving a terminal device. The method includes: receiving L3 measurements from the radio node, wherein the L3 measurements being converted from L1/L2 measurements of the terminal device on the radio node and one or more neighboring radio nodes of the radio node; and determining whether the terminal device is to perform handover from the radio node to one neighboring radio node of the radio node, based on the L3 measurements.

According to a fourth aspect of the present disclosure, there is provided a method used in a control node. The control node controls a radio node serving a terminal device. The terminal device has a cluster, which is controlled by a cluster manager under control of the control node and includes the radio node and one or more neighboring radio nodes of the radio node. The method includes: receiving L3 measurements from the cluster manager, wherein the L3 measurements are converted from L1/L2 measurements of the terminal device on the radio node and one or more neighboring radio nodes of the radio node; and determining whether the terminal device is to perform handover from the radio node to a radio node outside the cluster, based on the L3 measurements.

According to a fifth aspect of the present disclosure, there is provided a cluster manager controlling a cluster for a terminal device served by a radio node. The cluster manager is under control of a control node and the cluster includes the radio node. The cluster manager includes: a receiving unit configured to receive L1/L2 measurements of the terminal device on the radio node and one or more neighboring radio nodes of the radio node; a first determining unit configured to determine a target radio node, to which the terminal device is to be handed over, based on the L1/L2 measurements; a second determining unit configured to determine whether the target radio node is within the cluster; and a third determining unit configured to determine, if it is determined that the target radio node is within the cluster, whether the terminal device is to perform handover from a beam of the radio node to a beam of the target radio node.

According to a sixth aspect of the present disclosure, there is provided a radio node. The radio node is under control of a control node and serves a terminal device. The radio node includes: a receiving unit configured to receive, from the terminal device, L1/L2 measurements on the radio node and one or more neighboring radio nodes of the radio node; a converting unit configured to convert the L1/L2 measurements to L3 measurements; and a transmitting unit configured to transmit the L3 measurements to the control node for determining whether the terminal device is to perform handover from the radio node to one neighboring radio node of the radio node.

According to a seventh aspect of the present disclosure, there is provided a control node. The control node controls a radio node serving a terminal device. The control node includes: a receiving unit configured to receive L3 measurements from the radio node, wherein the L3 measurements being converted from L1/L2 measurements of the terminal device on the radio node and one or more neighboring radio nodes of the radio node; and a determining unit configured to determine whether the terminal device is to perform handover from the radio node to one neighboring radio node of the radio node, based on the L3 measurements.

According to an eighth aspect of the present disclosure, there is provided a control node. The control node controls a radio node serving a terminal device. The terminal device has a cluster, which is controlled by a cluster manager under control of the control node and includes the radio node and one or more neighboring radio nodes of the radio node. The control node includes: a receiving unit configured to receive L3 measurements from the cluster manager, wherein the L3 measurements are converted from L1/L2 measurements of the terminal device on the radio node and one or more neighboring radio nodes of the radio node; and a determining unit configured to determine whether the terminal device is to perform handover from the radio node to a radio node outside the cluster, based on the L3 measurements.

According to a ninth aspect of the present disclosure, there is provided a cluster manager controlling a cluster for a terminal device served by a radio node. The cluster manager is under control of a control node and the cluster includes the radio node. The cluster manager includes: a processor; and a memory containing instructions executable by said processor, whereby said cluster manager is operative to: receive L1/L2 measurements of the terminal device on the radio node and one or more neighboring radio nodes of the radio node; determine a target radio node, to which the terminal device is to be handed over, based on the L1/L2 measurements; determine whether the target radio node is within the cluster; and determine, if it is determined that the target radio node is within the cluster, whether the terminal device is to perform handover from a beam of the radio node to a beam of the target radio node.

According to a tenth aspect of the present disclosure, there is provided a radio node. The radio node is under control of a control node and serves a terminal device. The radio node includes: a processor; and a memory containing instructions executable by said processor, whereby said radio node is operative to: receive, from the terminal device, L1/L2 measurements on the radio node and one or more neighboring radio nodes of the radio node; convert the L1/L2 measurements to L3 measurements; and transmit the L3 measurements to the control node for determining whether the terminal device is to perform handover from the radio node to one neighboring radio node of the radio node.

According to an eleventh aspect of the present disclosure, there is provided a control node. The control node controls a radio node serving a terminal device. The control node includes: a processor; and a memory containing instructions executable by said processor, whereby said control node is operative to: receive L3 measurements from the radio node, wherein the L3 measurements being converted from L1/L2 measurements of the terminal device on the radio node and one or more neighboring radio nodes of the radio node; and determine whether the terminal device is to perform handover from the radio node to one neighboring radio node of the radio node, based on the L3 measurements.

According to a twelfth aspect of the present disclosure, there is provided a control node. The control node controls a radio node serving a terminal device. The terminal device has a cluster, which is controlled by a cluster manager under control of the control node and includes the radio node and one or more neighboring radio nodes of the radio node. The control node includes: a processor; and a memory containing instructions executable by said processor, whereby said control node is operative to: receive L3 measurements from the cluster manager, wherein the L3 measurements are converted from L1/L2 measurements of the terminal device on the radio node and one or more neighboring radio nodes of the radio node; and determine whether the terminal device is to perform handover from the radio node to a radio node outside the cluster, based on the L3 measurements.

According to a thirteenth aspect of the present disclosure, there is provided a cluster manager controlling a cluster for a terminal device served by a radio node. The cluster manager is under control of a control node and the cluster includes the radio node. The cluster manager includes a processing arrangement configured to: receive L1/L2 measurements of the terminal device on the radio node and one or more neighboring radio nodes of the radio node; determine a target radio node, to which the terminal device is to be handed over, based on the L1/L2 measurements; determine whether the target radio node is within the cluster; and determine, if it is determined that the target radio node is within the cluster, whether the terminal device is to perform handover from a beam of the radio node to a beam of the target radio node According to a fourteenth aspect of the present disclosure, there is provided a radio node. The radio node is under control of a control node and serves a terminal device. The radio node includes a processing arrangement configured to: receive, from the terminal device, L1/L2 measurements on the radio node and one or more neighboring radio nodes of the radio node; convert the L1/L2 measurements to L3 measurements; and transmit the L3 measurements to the control node for determining whether the terminal device is to perform handover from the radio node to one neighboring radio node of the radio node.

According to a fifteenth aspect of the present disclosure, there is provided a control node. The control node controls a radio node serving a terminal device. The control node includes a processing arrangement configured to: receive L3 measurements from the radio node, wherein the L3 measurements being converted from L1/L2 measurements of the terminal device on the radio node and one or more neighboring radio nodes of the radio node; and determine whether the terminal device is to perform handover from the radio node to one neighboring radio node of the radio node, based on the L3 measurements According to a sixteenth aspect of the present disclosure, there is provided a control node. The control node controls a radio node serving a terminal device. The terminal device has a cluster, which is controlled by a cluster manager under control of the control node and includes the radio node and one or more neighboring radio nodes of the radio node. The control node includes a processing arrangement configured to: receive L3 measurements from the cluster manager, wherein the L3 measurements are converted from L1/L2 measurements of the terminal device on the radio node and one or more neighboring radio nodes of the radio node; and determine whether the terminal device is to perform handover from the radio node to a radio node outside the cluster, based on the L3 measurements.

According to a seventeenth aspect of the present disclosure, there is provided a computer-readable storage medium storing instructions that when executed, causing one or more computing devices to perform the method according to any one of the first to the fourth aspects With the embodiments of the present disclosure, the UE only needs to directly transmit L1/L2 measurements to its serving AN without converting the L1/L2 measurements to L3 measurements, let alone reporting the L3 measurements, thereby simplifying the UE and reducing signaling from the UE.

Furthermore, according to some embodiments of the present disclosure, such as the first aspect, the cluster manager can handle handover from a beam of the serving AN to a beam of another AN within the same cluster, which may be called as intra-cluster beam switching. In this case, the UE does not need to transmit L3 measurements to the control node or receive handover command from the control node, thereby improving handover efficiency, especially in the intra-cluster beam switching.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 11 schematically illustrates a method 1100 used in a control node according to the second embodiment of the present disclosure.

FIG. 12 illustrates a sequence diagram of a handover procedure 1200 for use in a wireless communication system according to the second embodiment of the present disclosure.

FIGS. 16A-C are schematic block diagrams of another control node 1600 according to some embodiments of the present disclosure.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 2:
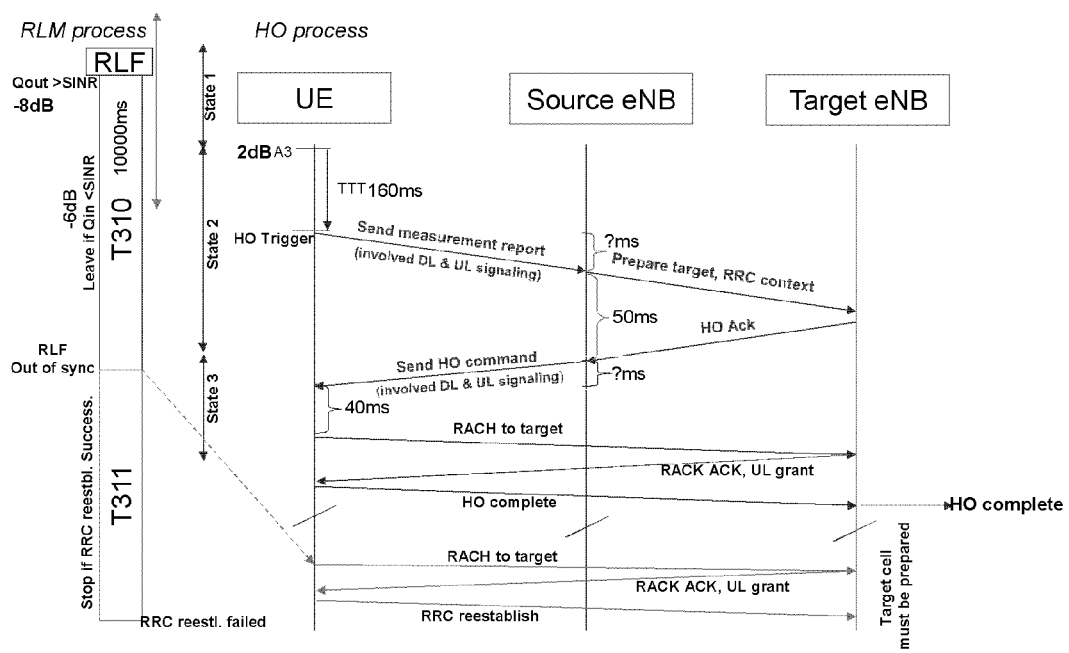
FIG. 2 shows the traditional handover procedure in LTE.

In the traditional cellular network, e.g., illustrated in FIG. 2, the switching (HO) is triggered by the UE's Measurement Report, which is usually a L3 measurement report from UE to eNB, and the decision is made at source eNB.

In the MMW-RAT system, the interface definition is a way that UE-AN interface is L2, UE-NC is L3, and AN-NC is L3. There could be a functionality split between AN and NC, and cluster head can handle the switching locally if the target AN is within reach/control, yet the NC can be responsible for other scenarios (out of the cluster).

Figure 3:
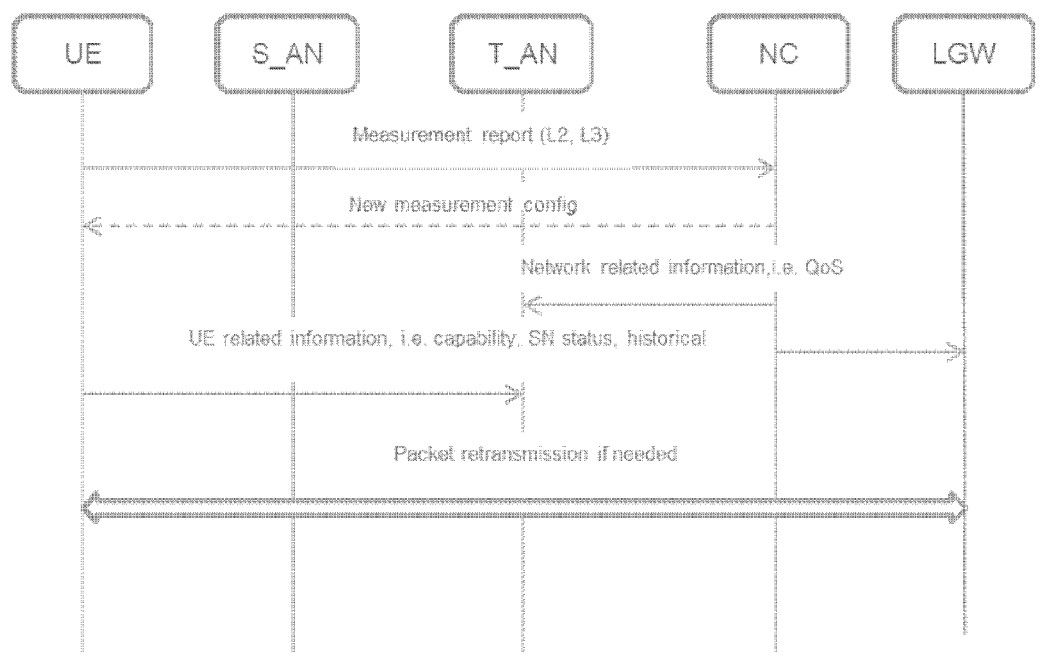
FIG. 3 shows the mobility procedure in MMW-RAT network.

For the switching in the MMW-RAT system, it may be the NC who decides the switching. In this case, if the traditional L3 from UE to NC MR trigger method as illustrated in FIG. 3 is adopted, it means that all switching related signalings including the measurement Report and the switching command have to be sent to/from NC via multi-hop backhaul links, which can lead to unnecessarily high latency in Control plane (CP) and consequently also in User plane (UP). For some switching that can be handled locally by cluster head, this is apparently not needed and should be avoided.

Considering at least one of these scenarios, the present disclosure firstly proposes to perform post-processing of a measurement report from a UE, at a radio node serving the UE or a cluster manager of the UE.

Figure 1:
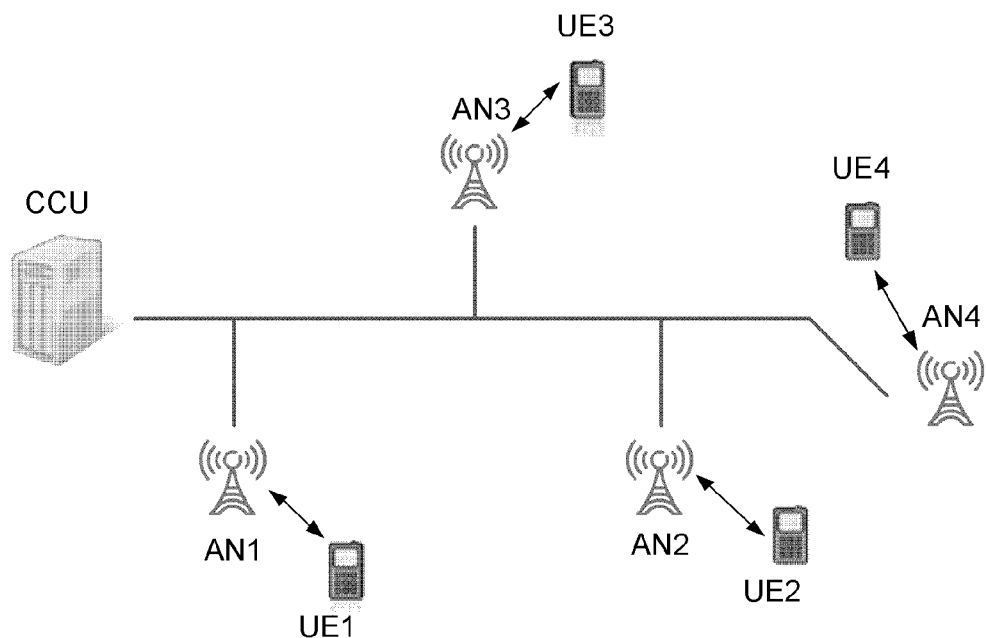
FIG. 1 schematically shows one example MMW RAT network.
Figure 5:
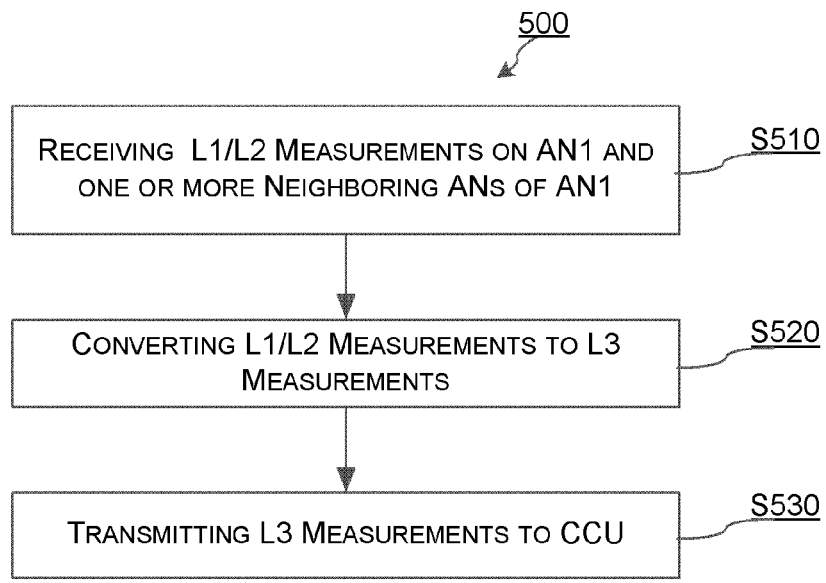
FIG. 5 schematically illustrates a method 500 used in a radio node according to a first embodiment of the present disclosure.

FIG. 5 schematically illustrates a method 500 used in a radio node according to a first embodiment of the present disclosure. The radio node is under control of a control node and serves a terminal device. For sake of illustration, the following descriptions on the method 500 will be made in the context of FIG. 1. In this case, the radio node may be any of AN1 to AN4, and the control node is CCU. Taking AN1 as an example, its served terminal device corresponds to UE1 as shown in FIG. 1. Of course, it would be appreciated that the method 500 may be also applied in any other appropriate wireless communication systems.

At step S510, AN1 receives, from UE1, L1/L2 measurements on AN1 and one or more neighboring ANs of AN1, e.g., AN2, AN3 or AN4. The L1/L2 measurements may be obtained by UE1 in a similar manner with the neighboring cell measurements in LTE, e.g., may be performed periodically, and thus detailed descriptions thereof are omitted here. For example, the L1/L2 measurements may include signal strengths of neighboring ANs such as Received Signal Code Power (RSCP), etc.

Then, at step S520, AN1 converts the L1/L2 measurements to L3 measurements. This process may be referred to as post-processing of measurement report, and should be well-known in the art. For example, the post processing could include the layer 3 filtering and the beamforming gain adjustment.

Finally, AN1 transmits the L3 measurements to CCU, at step S530. The L3 measurements will be used by the control node for determining whether UE1 is to perform handover from AN1 to one neighboring radio node of AN1, e.g., AN2, AN3 or AN4. For example, if CCU determines, from the L3 measurements, that RSCP of AN2 is better than that of AN1, CCU may determine that UE1 is to perform handover from AN1 to AN2.

With the method 500, AN1 plays a role of converting the L1/L2 measurements to the L3 measurements. That is, AN1 can perform post-processing on the L1/L2 measurements, instead of the UE1 itself doing so. In this way, UE1 only needs to report the L1/L2 measurements without the L3 measurements. This can reduce reporting signaling on neighboring AN measurements from the UE while simplifying the UE's processing.

Figure 6:
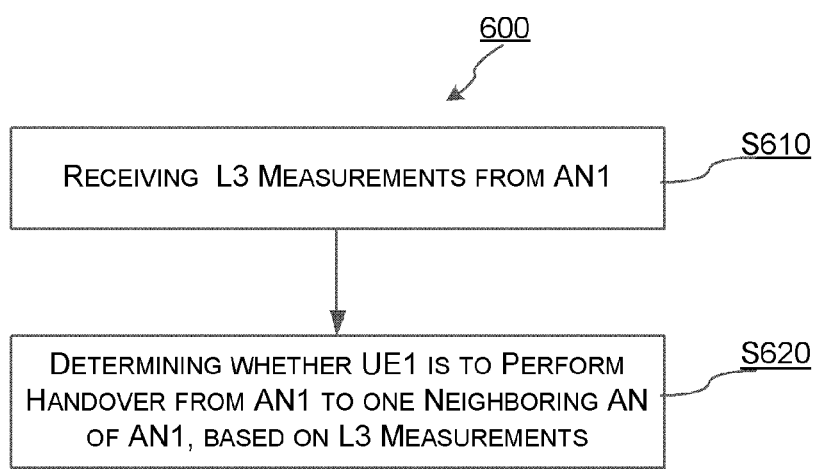
FIG. 6 schematically illustrates a method 600 used in a control node according to the first embodiment of the present disclosure.

FIG. 6 schematically illustrates a method 600 used in a control node according to the first embodiment of the present disclosure. The control node controls a radio node serving a terminal device. For sake of illustration, the following descriptions on the method 600 will be made in the context of FIG. 1. In this case, the control node is CCU, and the radio node may be any of AN1 to AN4. Taking AN1 as an example, its served terminal device corresponds to UE1 as shown in FIG. 1. Of course, it would be appreciated that the method 600 may be also applied in any other appropriate wireless communication systems.

At step S610, CCU receives L3 measurements from AN1. The L3 measurements are converted from L1/L2 measurements of UE1 on AN1 and one or more neighboring ANs of AN1, e.g., AN2, AN3 or AN4.

At step S620, CCU determines whether UE1 is to perform handover from AN1 to one neighboring AN of AN1, based on the L3 measurements. For example, if CCU determines, from the L3 measurements, that RSCP of AN2 is better than that of AN1, CCU may determine that UE1 is to perform handover from AN1 to AN2.

With the method 600, CCU can receive L3 measurements from AN1, instead of from UE1, and then make a handover decision for UE1 from AN1 to one neighboring AN of AN1. That is, CCU can make the handover decision by receiving the L3 measurements from AN1, other than directly from UE1, thereby reducing signaling from the UE.

Figure 7:
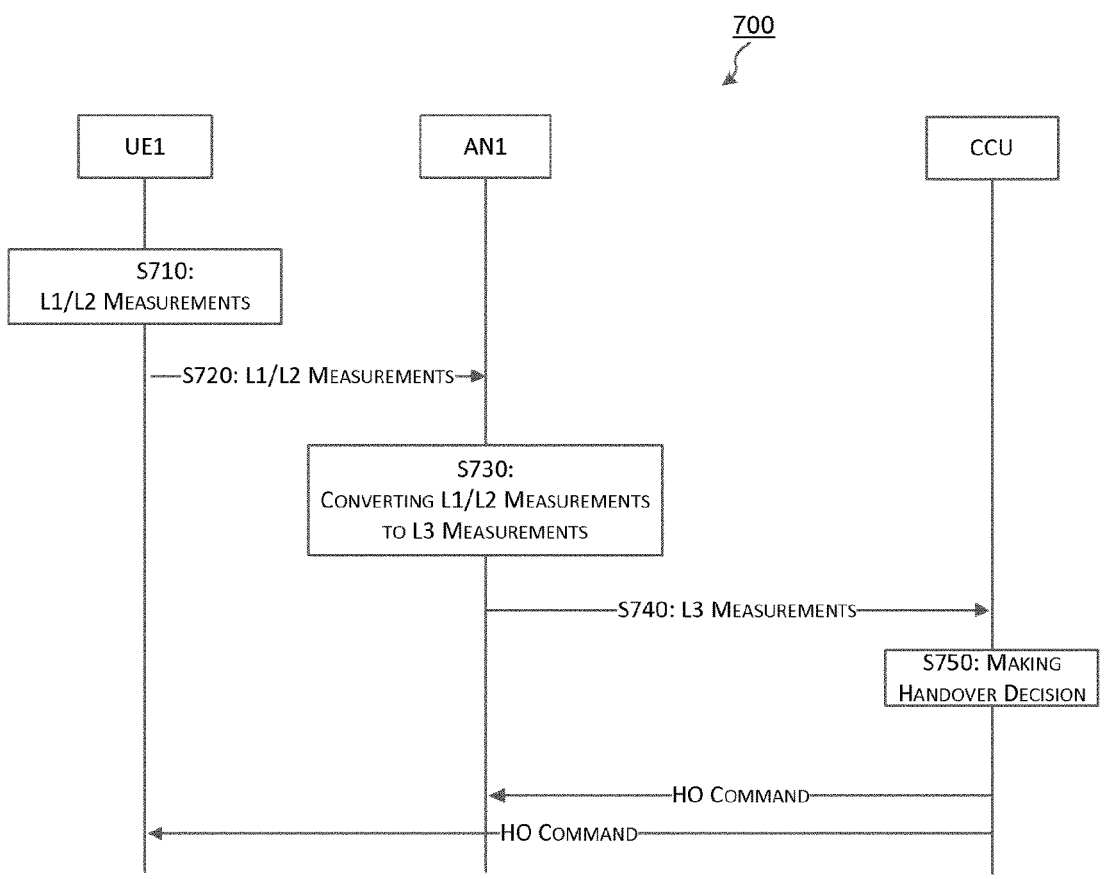
FIG. 7 illustrates a sequence diagram of a handover procedure 700 for use in a wireless communication system according to the first embodiment of the present disclosure FIGS. 8-10 schematically illustrate a method 800 used in a cluster manager according to the second embodiment of the present disclosure.

FIG. 7 illustrates a sequence diagram of a handover procedure 700 for use in a wireless communication system, e.g., the MMW-RAT network as illustrated in FIG. 1, according to the first embodiment of the present disclosure. For sake of illustration, the following descriptions will be made in the context of the MMW-RAT network as shown in FIG. 1. It will be appreciated that the handover procedure will be applied to any other appropriate wireless communication systems.

As shown in FIG. 7, UE1 performs L1/L2 measurements in downlink on its serving AN, i.e., AN1, as well as one or more neighboring ANs of AN1, at step S710. The neighboring ANs may be, e.g., AN2, AN3 or AN4. This operation may be done in a similar manner with the neighboring cell measurements in LTE, e.g., may be performed periodically, and thus detailed descriptions thereof are omitted here. For example, the L1/L2 measurements may include signal strengths of neighboring ANs, etc.

At step S720, UE1 transmits the L1/L2 measurements to AN1.

At step S730, AN1 converts the L1/L2 measurements to L3 measurements. Such a conversion is well-known in the art, and thus will not be described in details.

At step S740, AN1 transmits the L3 measurements to CCU.

At step S750, CCU uses the L3 measurements to make a decision on whether UE1 is to perform handover from AN1 to one neighboring AN of AN1, e.g., AN2, AN3 or AN4. If yes, CCU may further determine when to perform such a handover.

Thereafter, CCU may transmit a handover command to UE1 and/or AN1.

With the procedure 700, as the conversion of the L1/L2 measurements to the L3 measurements is done at AN1, UE1 only needs to report the L1/L2 measurements without converting L1/L2 measurements to the L3 measurements. This can reduce reporting signaling on neighboring AN measurements from the UE while simplifying the UE's processing.

In the following, a concept of cluster is introduced for facilitating the handover procedure. To be specific, a cluster is a group of ANs that are located in the vicinity of a UE and are ready to serve the UE. That is, members of the cluster will vary following movement of the UE. In this regard, the cluster should include the serving AN of the UE and one or more neighboring AN of the serving AN. There is a cluster manager for controlling the cluster and under control of CCU, also referred to as a Cluster Head (CH). As an example, the CH may be the serving AN of the UE. As another example, the CH may be the CCU.

In this regard, the present disclosure further proposes to make intra-cluster handover decision by the cluster manager and to make inter-cluster handover decision by the control node.

For sake of illustration, the following descriptions on a second embodiment of the present disclosure will be made in the context of the MMW-RAT network as shown in FIG. 1 by taking AN1, AN2 and AN3 as belonging to the same cluster for UE1, i.e., Cluster 1. In this case, CH1 serves as CH of Cluster 1. It will be appreciated that the present disclosure will be applied to any other appropriate wireless communication systems.

Figure 8:
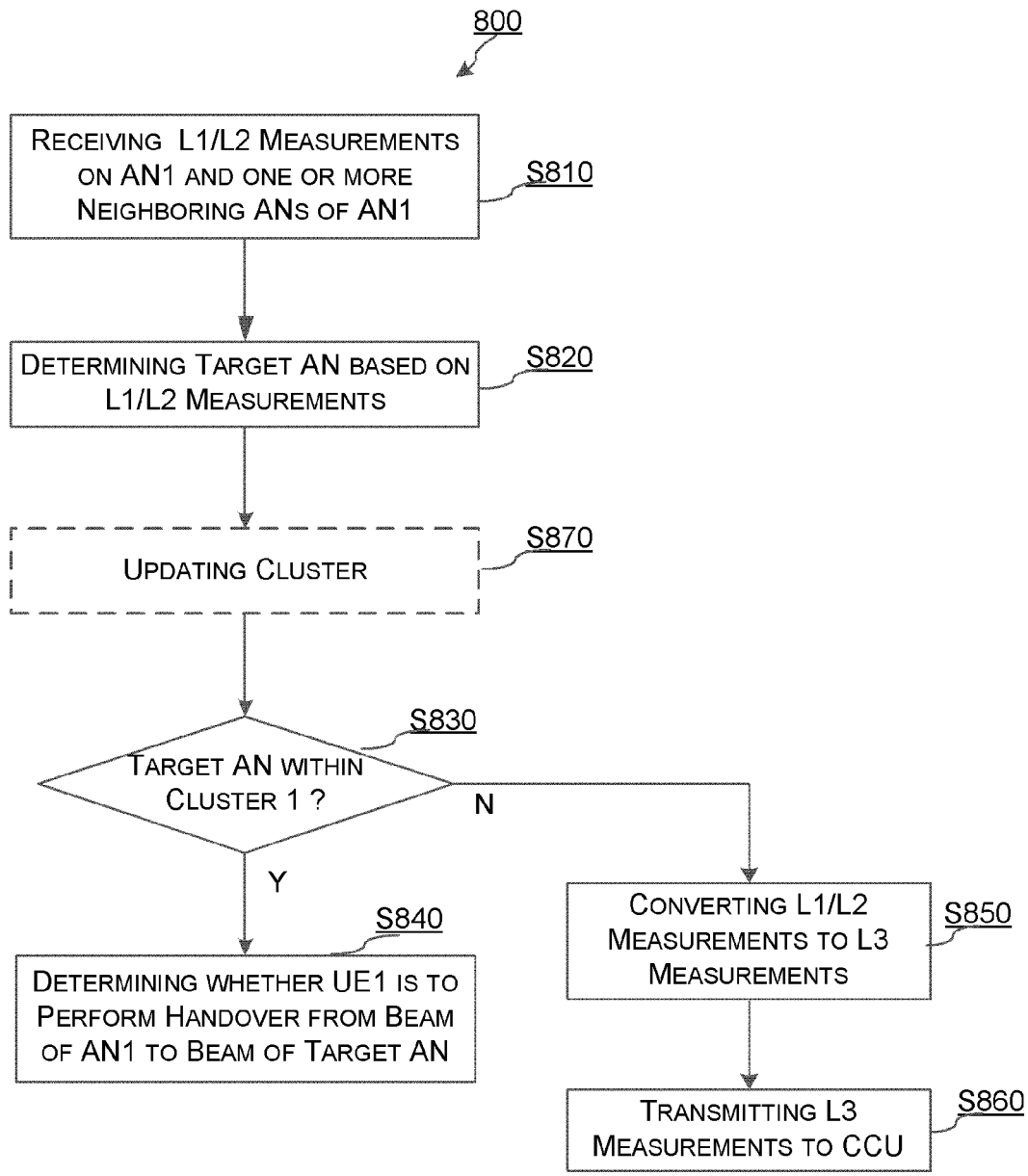

FIG. 8 schematically illustrates a method 800 used in a cluster manager according to the second embodiment of the present disclosure.

At step S810, CH1 receives L1/L2 measurements of UE1 on AN1 and one or more neighboring ANs of AN1, e.g., AN2, AN3 or AN4. The L1/L2 measurements may be received from UE1 either directly or via AN1. For example, the L1/L2 measurements may include signal strengths of neighboring ANs such as RSCP, etc.

At step S820, CH1 determines a target AN, to which UE1 is to be handed over, based on the L1/L2 measurements. For example, CH1 may determine one neighboring AN, e.g., AN2, having the largest signal strength, as the target AN.

At step S830, CH1 determines whether the target AN is within Cluster 1 or not. As CH1 controls Cluster 1, of course, it should determine whether one AN is within Cluster 1 or outside Cluster 1.

At step S840, if CH1 determines that the target AN is within Cluster 1, CH1 determines whether UE1 is to perform handover from a beam of AN1 to a beam of the target AN, that is, CH1 makes a decision on intra-cluster beam switching for UE1.

Optionally, if it is determined that the target AN is outside Cluster 1, CH1 converts the L1/L2 measurements to L3 measurements at step S850, and then at step S860, CH1 transmits the L3 measurements to CCU for determining whether UE is to perform handover from AN1 to the target AN.

Optionally, before step S830, the method 800 may further include step S870, where CH1 updates Cluster 1. Although in FIG. 8, step S870 is illustrated after step S820, it would be appreciated that this step may also occur before or at the same time with step S820.

Figure 9:
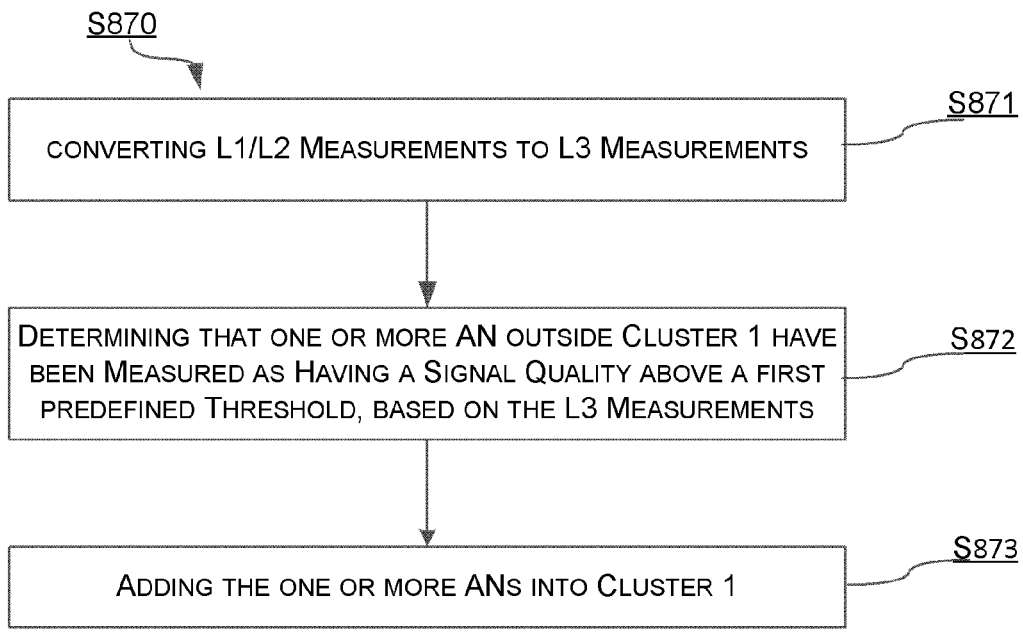

In an implementation, step S870 may include steps S871, S872 and S873 as illustrated in FIG. 9. At step S871, CH1 converts the L1/L2 measurements to L3 measurements. At step S872, CH1 determines that one or more AN outside Cluster 1 have been measured as having a signal quality above a first predefined threshold, based on the L3 measurements. At step S873, CH1 adds the one or more ANs into Cluster 1.

Figure 10:
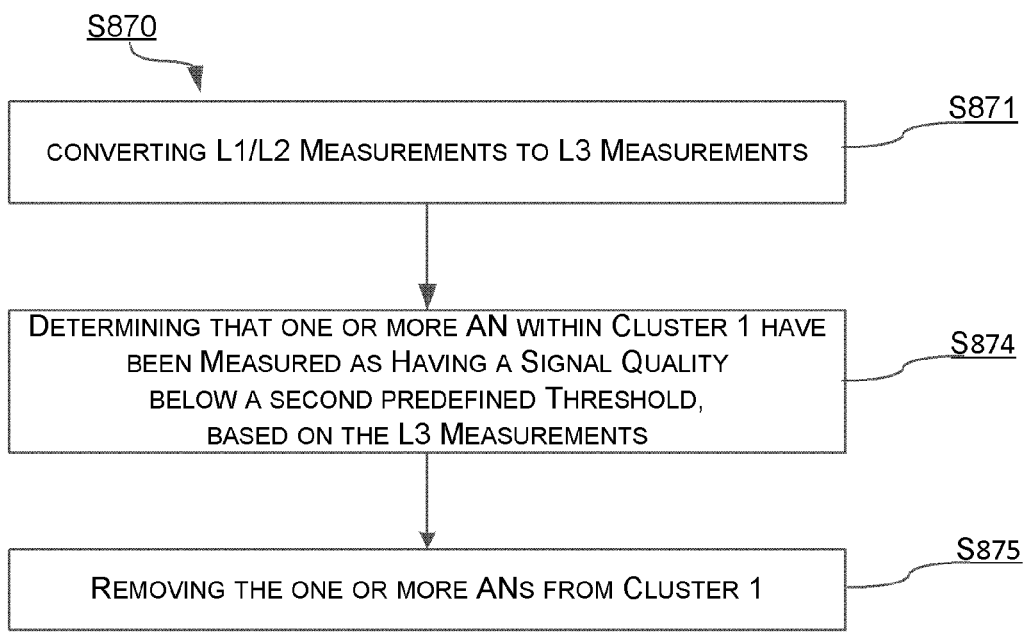

In another implementation, step S870 may include steps S871, S874 and S875 as illustrated in FIG. 10. At step S874, CH1 determines that one or more AN within Cluster 1 have been measured as having a signal quality below a second predefined threshold, based on the L3 measurements. At step S875, CH1 removes the detected one or more radio nodes from Cluster 1.

With the method 800 and its various variants, the cluster manager can host intra-cluster beam switching and achieve fast beam switching among ANs within the same cluster. Moreover, the cluster manager can take over conversion of the L1/L2 measurements to the L3 measurements from the UE, i.e., performing post-processing of measurement report, thereby reducing reporting signaling on neighboring AN measurements from the UE while simplifying the UE's processing.

FIG. 11 schematically illustrates a method 1100 used in a control node according to the second embodiment of the present disclosure.

At step S1110, CCU receives L3 measurements from CH1. The L3 measurements are converted from L1/L2 measurements of UE1 on AN1 and one or more neighboring ANs of AN1, e.g., AN2, AN3 or AN4.

At step S1120, CCU determines whether UE1 is to perform handover from AN1 to one AN outside Cluster 1, based on the L3 measurements.

With the method 1100, CCU can receive L3 measurements from CH1, instead of from UE1, and then make a handover decision for UE1 from AN1 to one neighboring AN of AN1 outside Cluster 1 (i.e., inter-cluster handover). That is, CCU can make the inter-cluster handover decision by receiving the L3 measurements from CH1, other than directly from UE1, thereby reducing signaling from the UE.

FIG. 12 illustrates a sequence diagram of a handover procedure 1200 for use in a wireless communication system according to the second embodiment of the present disclosure.

As illustrated in FIG. 12, UE1 performs L1/L2 measurements in downlink on neighboring ANs of its serving AN, i.e., AN1, at step S1210. The neighboring ANs may be AN2, AN3 or AN4. Typically, the L1/L2 measurements may further involve the serving AN. This operation may be done in a similar manner with the neighboring cell measurements in LTE, e.g., may be performed periodically, and thus detailed descriptions thereof are omitted here. For example, the L1/L2 measurements may include signal strengths of neighboring ANs, etc.

At step S1220, UE1 transmits the L1/L2 measurements to CH1. For example, UE1 may firstly transmit the L1/L2 measurements to AN1, which in turns forwards the L1/L2 measurements to CH1. Of course, it is also possible that UE1 transmits the L1/L2 measurements directly to CH1.

At step S1230, CH1 determines a target AN, to which UE1 is to be handed over, based on the L1/L2 measurements. For example, CH1 may determine one neighboring AN, e.g., AN2, having the largest signal strength, as the target AN.

At step S1240, CH1 determines whether the target AN is within Cluster 1 or not. As CH1 controls Cluster 1, of course, it should determine whether one AN is within Cluster 1 or outside Cluster 1.

If CH1 determines that the target AN is within Cluster 1, as denoted by "Y" branch from step S1240, the handover procedure 1200 goes to step S1250. At step S1250, CH1 makes a decision on whether UE1 is to perform handover from a beam of AN1 to a beam of the target AN (also called as a target beam). If yes, CH1 may further determine when to perform such a handover.

In this manner, CH1 can order the target AN to transmit data to UE1 in the target beam, and at the same time CH1 can correspondingly (or CH1 orders AN1 to) send a correspondingly handover command to UE, thereby achieving fast beam switching.

Otherwise, if CH1 determines that the target AN is not within Cluster 1, i.e., outside Cluster 1, as denoted by "N" branch from step S1240, the handover procedure 1200 proceeds to step S1260.

At step S1260, CH1 converts the L1/L2 measurements to L3 measurements. Thereafter, CH1 transmits the L3 measurements to CCU at step S1270.

At step S1280, CCU uses the L3 measurements to make a decision on whether UE1 is to perform handover from AN1 to one neighboring AN of AN1 outside Cluster 1, e.g., AN4. If yes, CCU may further determine when to perform such a handover. Thereafter, CCU may transmit a handover command to UE1 and/or CH1.

Moreover, it is possible that one or more ANs outside Cluster 1 have been measured by UE1 and their signal strengths are strong enough to serve the UE, or one or more ANs within Cluster 1 may be measured as being not appropriate to stay within Cluster 1. In this case, CH1 needs to perform updating of Cluster 1.

In this regard, before step S1240, the handover procedure may further include step S1290. Although in FIG. 12, step S1290 is illustrated after step S1230, it would be appreciated that this step may also occur before or at the same time with step S1230.

At step S1290, CH1 updates Cluster 1 based on the L1/L2 measurements. To be specific, it is possible that one or more ANs outside Cluster 1 have been measured by UE1 and their signal strengths are strong enough to serve the UE, or one or more ANs within Cluster 1 may be measured as being not appropriate to stay within Cluster 1. In this case, CH1 needs to perform updating of Cluster 1.

As a feasible implementation, the updating may be done by converting the L1/L2 measurements to L3 measurements;

determining that one or more ANs outside Cluster 1 have been measured as having a signal quality above a first predefined threshold, based on the L3 measurements; and adding the one or more ANs into Cluster 1. In this implementation, it is also possible that CH1 cannot handle one or more ANs outside Cluster 1, then CH1 will ask CCU for coordinating the updating.

As another feasible implementation, the updating may be done by converting the L1/L2 measurements to L3 measurements; determining that one or more ANs within the cluster have been measured as having a signal quality below a second predefined threshold, based on the L3 measurements; and removing the detected one or more ANs from Cluster 1.

For example, it is assumed that AN1, AN 2 and AN3 within Cluster 1, as well as AN4 outside Cluster 1 have been measured by UE1. From the L3 measurements, CH1 may determine RSCP of AN1, AN2, AN3 and AN4 as RSCP_AN1, RSCP_AN2, RSCP_AN3, and RSCP_AN4, respectively. Then, if RSCP_AN4>RSCP_AN1-XdB, CH1 will add AN4 into Cluster 1. If RSCP_AN3<RSCP_AN1-YdB, CH 1 will remove AN3 from Cluster 1. Here, specific values of X and Y may be preconfigured.

With the handover procedure 1200, the conversion of the L1/L2 measurements to the L3 measurements is done at CH1, UE1 only needs to report the L1/L2 measurements without converting L1/L2 measurements to the L3 measurements. This can reduce reporting signaling on neighboring AN measurements from the UE while simplifying the UE's processing.

Moreover, for intra-cluster beam switching, CH1 can achieve fast beam switching among ANs within the same cluster. This can mitigate signaling to/from CCU, thereby somewhat offloading CCU and reducing latency as well as interference due to the additional signaling transmission between CH1 and CCU.

According to some embodiments of the present disclosure, there is provided a control node 1300 being under control of a control node and serving a terminal device. The control node 1300 is configured to receive, from the terminal device, L1/L2 measurements on the radio node and one or more neighboring radio nodes of the radio node; convert the L1/L2 measurements to L3 measurements; and transmit the L3 measurements to the control node for determining whether the terminal device is to perform handover from the radio node to one neighboring radio node of the radio node.

For example, the radio node 1300 may be AN1 as shown in FIG. 1, and correspondingly, its control node is CCU and the served terminal device is UE1.

The radio node 1300 may be applied to implement the method 500 as shown in FIG. 5, or to participant in the handover procedure 700 as shown in FIG. 7.

Figure 13A:
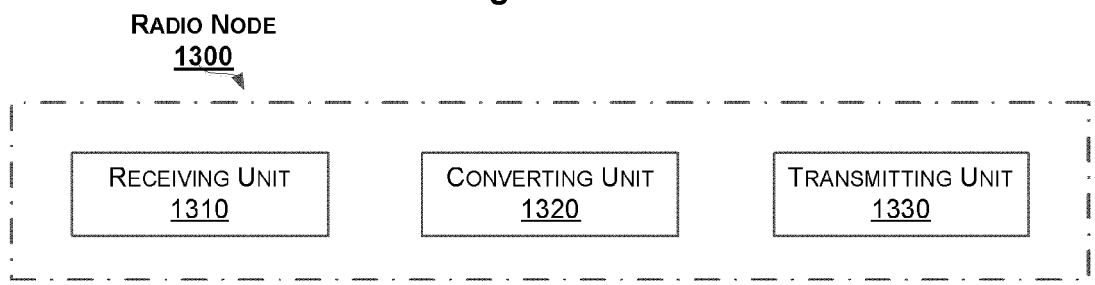
FIGS. 13A-C are schematic block diagrams of a radio node 1300 according to some embodiments of the present disclosure.

FIG. 13A is a schematic block diagram of the radio node 1300 according to a particular embodiment of the present disclosure.

According to this embodiment, the radio node 1300 includes a receiving unit 1310, a converting unit 1320 and a transmitting unit 1330, as shown in FIG. 13A.

The receiving unit 1310 is configured to receive, from the terminal device, L1/L2 measurements on the radio node and one or more neighboring radio nodes of the radio node, e.g., AN2, AN3 or AN4 as shown in FIG. 1.

The converting unit 1320 is configured to convert the L1/L2 measurements to L3 measurements, e.g., in a similar manner with the legacy neighboring cell measurements in LTE.

The transmitting unit 1330 is configured to transmit the L3 measurements to the control node for determining whether the terminal device is to perform handover from the radio node to one neighboring radio node of the radio node.

It should be noted that two or more different units in this disclosure may be logically or physically combined. For example, the receiving unit 1310 and the transmitting unit 1330 may be combined as one single unit, e.g., a transceiver in the radio node.

Figure 13B:
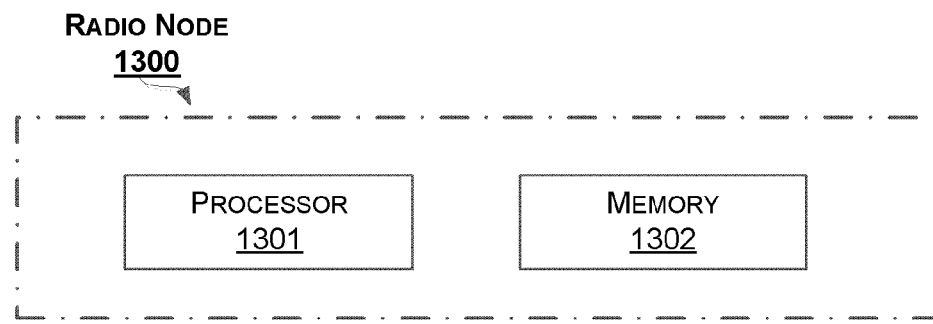

FIG. 13B is a schematic block diagram of the radio node 1300 according to another particular embodiment of the present disclosure.

According to this embodiment, the radio node 1300 includes a processor 1301 and an associated memory 1302, as illustrated in FIG. 13B. The processor 1301 may also be referred to as processing module, processing unit or processing circuitry. The memory 1302 may be arranged to be used to store executable instructions and data to perform the actions illustrated, e.g., in FIG. 5 and/or FIG. 7.

So, when the executable instructions are executed on the processor 1301, the processor 1301 is capable of causing the radio node 1300 to perform, e.g., the method 500 and/or the method 700. For example, by having the executable instructions stored in the memory 1302 ran on the processor 1301, the radio node 1300 is operative to receive, from the terminal device, L1/L2 measurements on the radio node and one or more neighboring radio nodes of the radio node; convert the L1/L2 measurements to L3 measurements; and transmit the L3 measurements to the control node for determining whether the terminal device is to perform handover from the radio node to one neighboring radio node of the radio node.

Figure 13C:
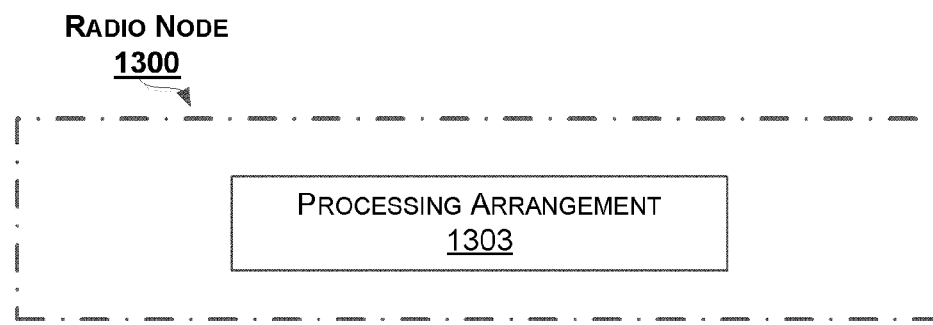

FIG. 13C is a schematic block diagram of the radio node 1300 according to a further particular embodiment of the present disclosure.

According to this embodiment, the radio node 1300 includes a processing arrangement 1303, as illustrated in FIG. 13C. The processing arrangement 1303 may be configured to perform the actions illustrated, e.g., in FIG. 5 and/or FIG. 7. For example, the processing arrangement 1303 may be configured to receive, from the terminal device, L1/L2 measurements on the radio node and one or more neighboring radio nodes of the radio node; convert the L1/L2 measurements to L3 measurements; and to transmit the L3 measurements to the control node for determining whether the terminal device is to perform handover from the radio node to one neighboring radio node of the radio node.

According to some embodiments of the present disclosure, there is provided a cluster manager 1400. The cluster manager controls a cluster for a terminal device served by a radio node, and is under control of a control node. The cluster includes the radio node. The cluster manager 1400 is configured to receive L1/L2 measurements of the terminal device on the radio node and one or more neighboring radio nodes of the radio node; determine a target radio node, to which the terminal device is to be handed over, based on the L1/L2 measurements; determine whether the target radio node is within the cluster; and if it is determined that the target radio node is within the cluster, determine whether the terminal device is to perform handover from a beam of the radio node to a beam of the target radio node.

Figure 4:
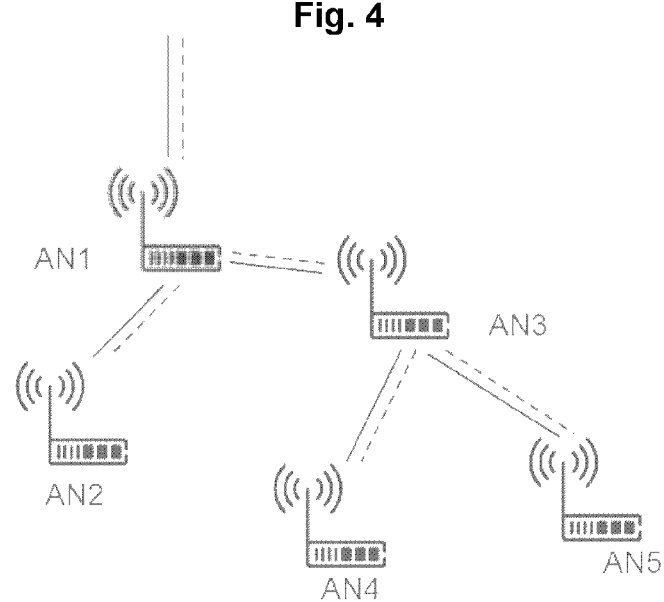
FIG. 4 illustrates an exemplary deployment of the MMW-RAT system.

For example, the cluster manager 1400 may be CH1 as shown in FIG. 4, and correspondingly the radio node may be AN1, the control node is CCU and the served terminal device is UE1. In an example, the cluster manager 1400 may be AN1. In another example, the cluster manager 1400 may be CCU. The cluster manager 1400 may be applied to implement the method 800 as shown in FIG. 8, or to participant in the handover procedure 1200 as shown in FIG. 12.

Figure 14A:
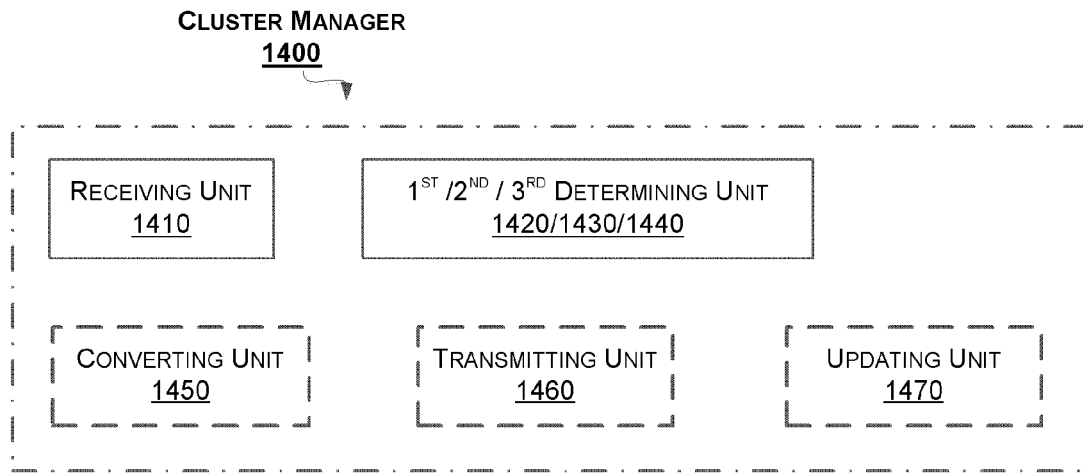
FIGS. 14A-C are schematic block diagrams of a cluster manager 1400 according to some embodiments of the present disclosure.

FIG. 14A is a schematic block diagram of the cluster manager 1400 according to a particular embodiment of the present disclosure.

As shown in FIG. 14A, the cluster manager 1400 includes a receiving unit 1410, a first determining unit 1420, a second determining unit 1430, a third determining unit 1440, a converting unit 1450, a transmitting unit 1460, and an updating unit 1470. The converting unit 1450, the transmitting unit 1460, and the updating unit 1470 are optional.

The receiving unit 1410 is configured to receive L1/L2 measurements of the terminal device on the radio node and one or more neighboring radio nodes of the radio node.

The first determining unit 1420 is configured to determine a target radio node, to which the terminal device is to be handed over, based on the L1/L2 measurements.

The second determining unit 1430 is configured to determine whether the target radio node is within the cluster.

The third determining unit 1440 is configured to determine, if it is determined that the target radio node is within the cluster, whether the terminal device is to perform handover from a beam of the radio node to a beam of the target radio node.

The converting unit 1450 is configured to convert, if it is determined that the target radio node is outside the cluster, the L1/L2 measurements to L3 measurements.

The transmitting unit 1460 is configured to transmit the L3 measurements to the control node for determining whether the terminal device is to perform handover from the radio node to the target radio node.

The updating unit 1470 is configured to update, before the third determining unit 1440 determines whether the target radio node is within the cluster, the cluster based on the L1/L2 measurements. As an example, the updating unit 1470 is further configured to: convert the L1/L2 measurements to L3 measurements; determine that one or more radio nodes outside the cluster have been measured as having a signal quality above a first predefined threshold, based on the L3 measurements; and add the one or more radio node into the cluster. As another example, the updating unit 1470 is further configured to: convert the L1/L2 measurements to L3 measurements; determine that one or more radio nodes within the cluster have been measured as having a signal quality below a second predefined threshold, based on the L3 measurements; and remove the detected one or more radio nodes from the cluster.

It should be noted that two or more different units in this disclosure may be logically or physically combined. For example, the first to third determining units 1420-1440 may be combined as one single unit, e.g., a processor in the cluster manager.

Figure 14B:
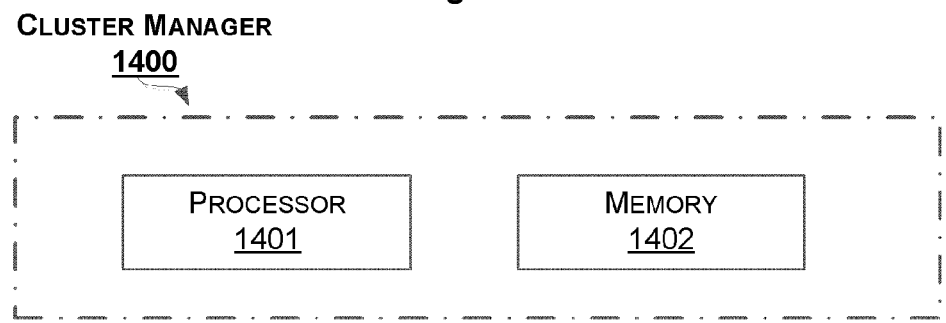

FIG. 14B is a schematic block diagram of the cluster manager 1400 according to another particular embodiment of the present disclosure.

According to this embodiment, the cluster manager 1400 includes a processor 1401 and an associated memory 1402, as illustrated in FIG. 14B. The processor 1401 may also be referred to as processing module, processing unit or processing circuitry. The memory 1402 may be arranged to be used to store executable instructions and data to perform the actions illustrated, e.g., in FIG. 8 and/or FIG. 12.

So, when the executable instructions are executed on the processor 1401, the processor 1401 is capable of causing the cluster manager 1400 to perform, e.g., the method 800 and/or the method 1200. For example, by having the executable instructions stored in the memory 1402 ran on the processor 1401, the cluster manager 1400 is operative to receive L1/L2 measurements of the terminal device on the radio node and one or more neighboring radio nodes of the radio node; to determine a target radio node, to which the terminal device is to be handed over, based on the L1/L2 measurements; to determine whether the target radio node is within the cluster; and if it is determined that the target radio node is within the cluster, to determine whether the terminal device is to perform handover from a beam of the radio node to a beam of the target radio node.

Figure 14C:
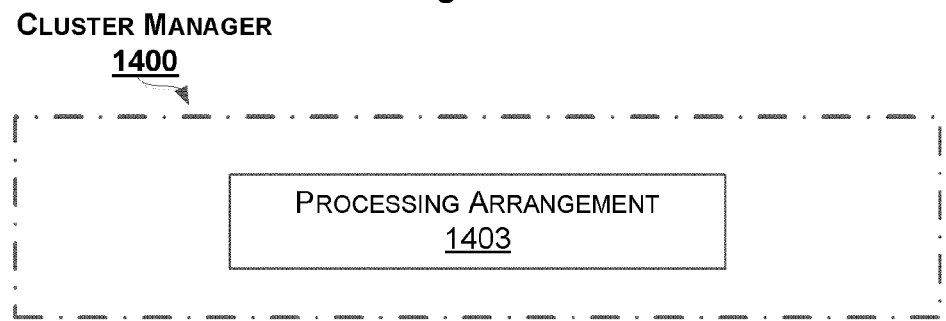

FIG. 14C is a schematic block diagram of the cluster manager 1400 according to a further particular embodiment of the present disclosure.

According to this embodiment, the cluster manager 1400 includes a processing arrangement 1403, as illustrated in FIG. 14C. The processing arrangement 1403 may be configured to perform the actions illustrated, e.g., e.g., in FIG. 8 and/or FIG. 12. For example, the processing arrangement 1403 may be configured to: receive L1/L2 measurements of the terminal device on the radio node and one or more neighboring radio nodes of the radio node; determine a target radio node, to which the terminal device is to be handed over, based on the L1/L2 measurements; determine whether the target radio node is within the cluster; and if it is determined that the target radio node is within the cluster, determine whether the terminal device is to perform handover from a beam of the radio node to a beam of the target radio node.

According to some embodiments of the present disclosure, there is provided a control node 1500. The control node 1500 controls a radio node serving a terminal device. The control node 1500 is configured to receive L3 measurements from the radio node, wherein the L3 measurements being converted from L1/L2 measurements of the terminal device on the radio node and one or more neighboring radio nodes of the radio node. The control node 1500 is further configured to determine whether the terminal device is to perform handover from the radio node to one neighboring radio node of the radio node, based on the L3 measurements.

For example, the control node 1500 may be CCU as shown in FIG. 1, and correspondingly the radio node may be AN1 and the terminal device is UE1. The control node 1500 may be applied to implement the method 600 as shown in FIG. 6, or to participant in the handover procedure 700 as shown in FIG. 7.

Figure 15A:
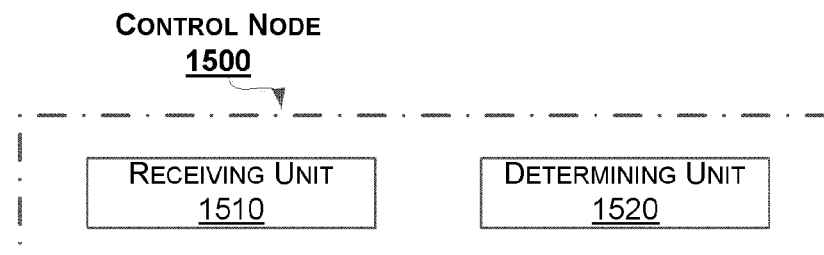
FIGS. 15A-C are schematic block diagrams of a control node 1500 according to some embodiments of the present disclosure.

FIG. 15A is a schematic block diagram of the control node 1500 according to a particular embodiment of the present disclosure.

According to this embodiment, the control node 1500 includes a receiving unit 1510 and a determining unit 1520, as shown in FIG. 15A.

The receiving unit 1510 is configured to receive L3 measurements from the radio node. The L3 measurements are converted from L1/L2 measurements of the terminal device on the radio node and one or more neighboring radio nodes of the radio node.

The determining unit 1520 is configured to determine whether the terminal device is to perform handover from the radio node to one neighboring radio node of the radio node, based on the L3 measurements.

Figure 15B:
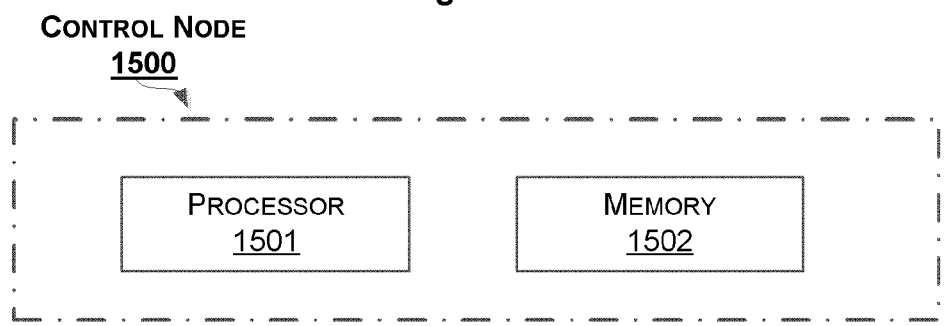

FIG. 15B is a schematic block diagram of the control node 1500 according to another particular embodiment of the present disclosure.

According to this embodiment, the control node 1500 includes a processor 1501 and an associated memory 1502. The processor 1501 may also be referred to as processing module, processing unit or processing circuitry. The memory 1502 may be arranged to be used to store executable instructions and data to perform the actions illustrated, e.g., in FIG. 6 and/or FIG. 7.

So, when the executable instructions are executed on the processor 1501, the processor 1501 is capable of causing the control node 1500 to perform, e.g., the method 600 and/or the method 700. For example, by having the executable instructions stored in the memory 1502 ran on the processor 1501, the control node 1500 is operative to: receive L3 measurements from the radio node, wherein the L3 measurements are converted from L1/L2 measurements of the terminal device on the radio node and one or more neighboring radio nodes of the radio node; and determine whether the terminal device is to perform handover from the radio node to one neighboring radio node of the radio node, based on the L3 measurements.

Figure 15C:
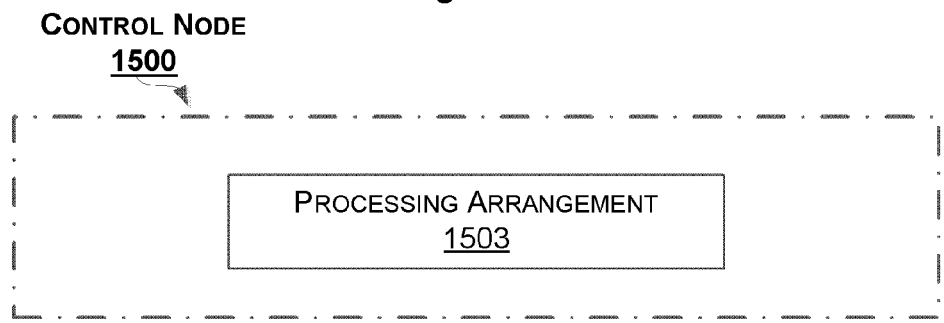

FIG. 15C is a schematic block diagram of the control node 1500 according to a further particular embodiment of the present disclosure.

According to this embodiment, the control node 1500 includes a processing arrangement 1503. The processing arrangement 1503 may be configured to perform the actions illustrated, e.g., in FIG. 6 and/or FIG. 7. For example, the processing arrangement 1503 may be configured to receive L3 measurements from the radio node. The L3 measurements are converted from L1/L2 measurements of the terminal device on the radio node and one or more neighboring radio nodes of the radio node. The processing arrangement 1503 may be further configured to determine whether the terminal device is to perform handover from the radio node to one neighboring radio node of the radio node, based on the L3 measurements.

According to some embodiments of the present disclosure, there is provided a control node 1600. The control node 1600 controls a radio node serving a terminal device. The terminal device has a cluster, which is controlled by a cluster manager under control of the control node and includes the radio node and one or more neighboring radio nodes of the radio node. The control node 1600 is configured to receive L3 measurements from the cluster manager. The L3 measurements are converted from L1/L2 measurements of the terminal device on the radio node and one or more neighboring radio nodes of the radio node. The control node 1600 is further configured to determine whether the terminal device is to perform handover from the radio node to a radio node outside the cluster, based on the L3 measurements.

For example, the control node 1600 may be CCU as shown in FIG. 1, and correspondingly the radio node may be AN1 and the terminal device is UE1. Moreover, UE1 has a cluster formed of AN1, AN2 and AN3, as illustrated in FIG. 4, then the cluster manager is CH1 for Cluster 1. The control node 1600 may be applied to implement the method 1100 as shown in FIG. 11, or to participant in the handover procedure 1200 as shown in FIG. 12.

FIG. 16A is a schematic block diagram of the control node 1600 according to a particular embodiment of the present disclosure.

According to this embodiment, the control node 1600 includes a receiving unit 1610 and a determining unit 1620, as shown in FIG. 16A.

The receiving unit 1610 is configured to receive L3 measurements from the cluster manager. The L3 measurements are converted from L1/L2 measurements of the terminal device on the radio node and one or more neighboring radio nodes of the radio node.

The determining unit 1620 is configured to determine whether the terminal device is to perform handover from the radio node to a radio node outside the cluster, based on the L3 measurements.

FIG. 16B is a schematic block diagram of the control node 1600 according to another particular embodiment of the present disclosure.

According to this embodiment, the control node 1600 includes a processor 1601 and an associated memory 1602. The processor 1601 may also be referred to as processing module, processing unit or processing circuitry. The memory 1602 may be arranged to be used to store executable instructions and data to perform the actions illustrated, e.g., in FIG. 11 and/or FIG. 12.

So, when the executable instructions are executed on the processor 1601, the processor 1601 is capable of causing the control node 1600 to perform, e.g., the method 1100 and/or the method 1200. For example, by having the executable instructions stored in the memory 1602 ran on the processor 1601, the control node 1600 is operative to: receive L3 measurements from the cluster manager, wherein the L3 measurements are converted from L1/L2 measurements of the terminal device on the radio node and one or more neighboring radio nodes of the radio node; and determine whether the terminal device is to perform handover from the radio node to a radio node outside the cluster, based on the L3 measurements.

FIG. 16C is a schematic block diagram of the control node 1600 according to a further particular embodiment of the present disclosure.

According to this embodiment, the control node 1600 includes a processing arrangement 1603. The processing arrangement 1603 may be configured to perform the actions illustrated, e.g., in FIG. 11 and/or FIG. 12. For example, the processing arrangement 1603 may be configured to receive L3 measurements from the cluster manager. The L3 measurements are converted from L1/L2 measurements of the terminal device on the radio node and one or more neighboring radio nodes of the radio node. The processing arrangement 1603 may be further configured to determine whether the terminal device is to perform handover from the radio node to a radio node outside the cluster, based on the L3 measurements.

Figure 17:
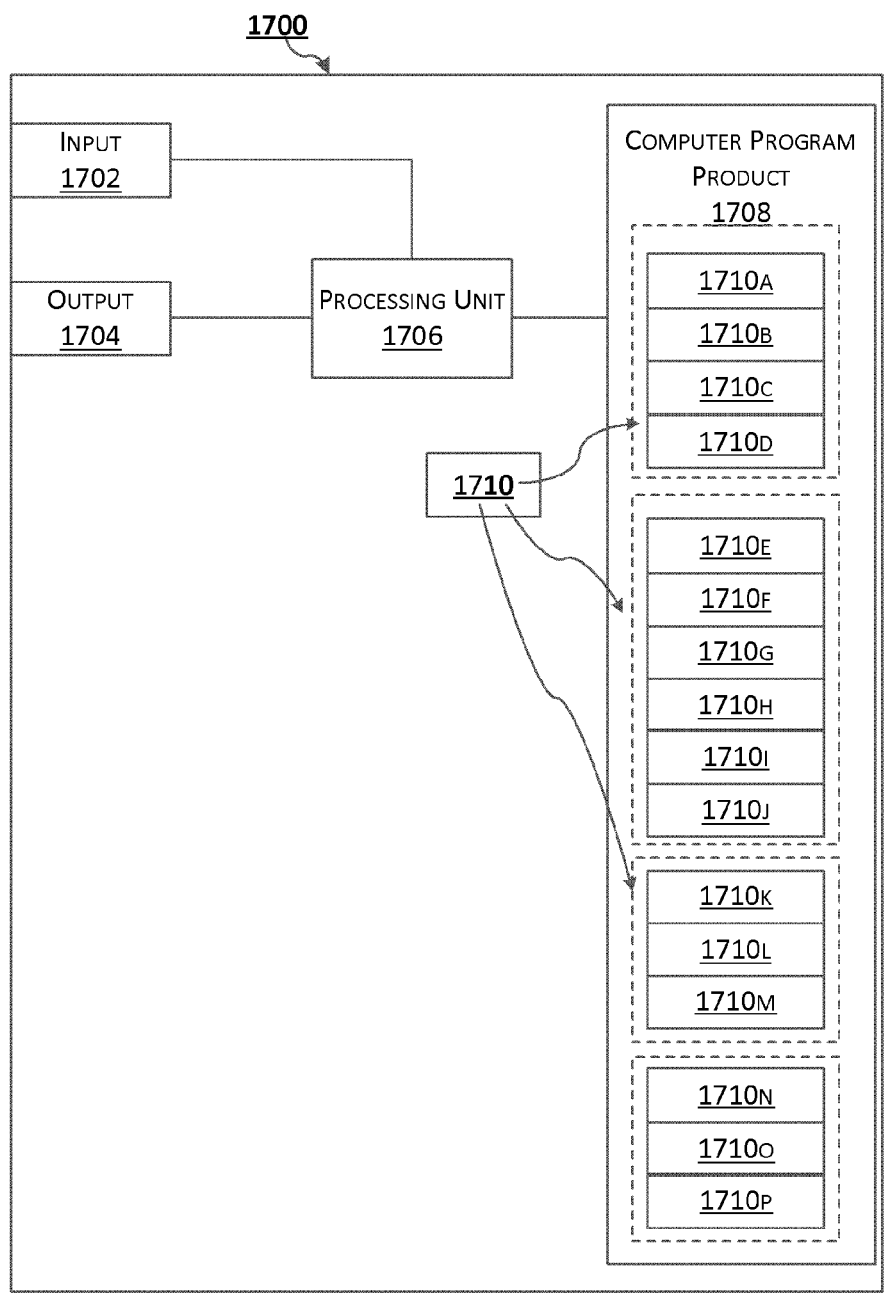
FIG. 17 schematically shows an embodiment of an arrangement 1700 which may be used in the radio node 1300, the cluster manager 1400, or the control node 1500 or 1600 according to the present disclosure.

FIG. 17 schematically shows an embodiment of an arrangement 1700 comprising at least one particular computer program product 1708 according to a particular embodiment of the present disclosure. The arrangement 1700 may be used in the radio node 1300, the cluster manager 1400, or the control node 1500 or 1600 according to the present disclosure. Comprised in the arrangement 1700 are here a processing unit 1706, e.g., with a Digital Signal Processor (DSP). The processing unit 1706 may be a single unit or a plurality of units to perform different actions of procedures described herein. The arrangement 1700 may also comprise an input unit 1702 for receiving signals from other entities, and an output unit 1704 for providing signal(s) to other entities. The input unit and the output unit may be arranged as an integrated entity or as illustrated in the example of FIG. 13, FIG. 14, FIG. 15 or FIG. 16.

Furthermore, the at least one computer program product 1708 may be in the form of a non-volatile or volatile memory, e.g., an Electrically Erasable Programmable Read-Only Memory (EEPROM), a flash memory and a hard drive. The computer program product 1708 comprises a computer program 1710, which comprises code/computer readable instructions, which when executed by the processing unit 1706 in the arrangement 1700 causes the arrangement 1700 and/or the network node or the UE in which it is comprised to perform the actions, e.g., of the procedure described earlier in conjunction with either of FIGS. 5-12.

The computer program 1710 may be configured as a computer program code structured in computer program modules 1710A-1710D, 1710E-1710J, 1710K-1710M, or 1710N-1710P. Hence, in an exemplifying embodiment when the arrangement 1700 is used in the radio node 1300, the code in the computer program of the arrangement 1700 includes a receiving module 1710A, for receiving, from the terminal device, L1/L2 measurements on the radio node and one or more neighboring radio nodes of the radio node. The code in the computer program 1710 further includes a converting module 1710B, for converting the L1/L2 measurements to L3 measurements. The code in the computer program 1710 may further include a transmitting module 1710C, for transmitting the L3 measurements to the control node for determining whether the terminal device is to perform handover from the radio node to one neighboring radio node of the radio node. The code in the computer program 1710 may comprise further modules, illustrated as module 1710D, e.g. for controlling and performing other related procedures associated with the radio node's operations.

In another exemplifying embodiment when the arrangement 1700 is used in the cluster manager 1400, the code in the computer program of the arrangement 1700 includes a receiving module 1710E, for receiving L1/L2 measurements of the terminal device on the radio node and one or more neighboring radio nodes of the radio node. The code in the computer program further includes a determining module 1710F, for determining a target radio node, to which the terminal device is to be handed over, based on the L1/L2 measurements; determining whether the target radio node is within the cluster; and determining, if it is determined that the target radio node is within the cluster, whether the terminal device is to perform handover from a beam of the radio node to a beam of the target radio node. The code in the computer program further includes a converting module 1710G, for converting, if it is determined that the target radio node is outside the cluster, the L1/L2 measurements to Layer 3 (L3) measurements. The code in the computer program further includes a transmitting module 1710H, for transmitting the L3 measurements to the control node for determining whether the terminal device is to perform handover from the radio node to the target radio node. The code in the computer program further includes an updating module 1710I, for update, before the determining module determines whether the target radio node is within the cluster, the cluster based on the L1/L2 measurements. The code in the computer program 1710 may comprise further modules, illustrated as module 1710J, e.g. for controlling and performing other related procedures associated with the cluster manager's operations.

In yet another exemplifying embodiment when the arrangement 1700 is used in the control node 1500, the code in the computer program of the arrangement 1700 includes a receiving module 1710K, for receiving L3 measurements from the radio node. The code in the computer program 1710 further includes a determining module 1710L, for determining whether the terminal device is to perform handover from the radio node to one neighboring radio node of the radio node, based on the L3 measurements. The code in the computer program 1710 may comprise further modules, illustrated as module 1710M, e.g. for controlling and performing other related procedures associated with the control node's operations.

In a further exemplifying embodiment when the arrangement 1700 is used in the control node 1600, the code in the computer program of the arrangement 1700 includes a receiving module 1710N, for receiving L3 measurements from the cluster manager. The code in the computer program 1710 further includes a determining module 1710O, for determining whether the terminal device is to perform handover from the radio node to a radio node outside the cluster, based on the L3 measurements. The code in the computer program 1710 may comprise further modules, illustrated as module 1710P, e.g. for controlling and performing other related procedures associated with the control node's operations.

The computer program modules could essentially perform the actions of the flow illustrated in FIG. 5, to emulate the radio node 1300, or the actions of the flow illustrated in FIG. 8, to emulate the cluster manager 1400, or the actions of the flow illustrated in FIG. 6 to emulate the control node 1500, or the actions of the flow illustrated in FIG. 11 to emulate the control node 1600. In other words, when the different computer program modules are executed in the processing unit 1706, they may correspond, e.g., to the units 1310-1330 or 1301-1302 or 1303 of FIG. 13, or to the units 1410-1470 or 1401-1402 or 1403 of FIG. 14, or to the units 1510-1520 or 1501-1502 or 1503 in FIG. 15, or to the units 1610-1620 or 1601-1602 or 1603 in FIG. 16.

Although the code means in the embodiments disclosed above in conjunction with FIG. 17 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a cluster manager controlling a cluster for a terminal device served by a radio node, wherein the cluster manager is under control of a control node and the cluster includes the radio node, the method comprising:
receiving Layer 1 (L1)/Layer 2 (L2) measurements of the terminal device on the radio node and one or more neighboring radio nodes of the radio node; determining a target radio node, to which the terminal device is to be handed over, based on the L1/L2 measurements;

determining whether the target radio node is within the cluster; and if it is determined that the target radio node is within the cluster, determining whether the terminal device is to perform a handover from a beam of the radio node to a beam of the target radio node.

2. The method according to claim 1, further comprising: if it is determined that the target radio node is outside the cluster, converting the L1/L2 measurements to Layer 3 (L3) measurements; and transmitting the L3 measurements to the control node for determining whether the terminal device is to perform the handover from the radio node to the target radio node.

3. The method according to claim 1, wherein before determining whether the target radio node is within the cluster, the method further comprises; updating the cluster based on the L1/L2 measurements.

4. The method according to claim 3, wherein updating the cluster based on the L1/L2 measurements comprises: converting the L1/L2 measurements to Layer 3 (L3) measurements; determining that one or more radio nodes outside the cluster have been measured as having a signal quality above a first predefined threshold, based on the L3 measurements; and adding the one or more radio nodes into the cluster.

5. The method according to claim 3, wherein updating the cluster based on the L1/L2 measurements comprises: converting the L1/L2 measurements to Layer 3 (L3) measurements; determining that one or more radio nodes within the cluster have been measured as having a signal quality below a second predefined threshold, based on the L3 measurements; and removing the detected one or more radio nodes from the cluster.

6. A cluster manager controlling a cluster for a terminal device served by a radio node, wherein the cluster manager is under control of a control node and the cluster includes the radio node, the cluster manager comprising:

a processor; and a memory containing instructions which when executed by said processor-cause said cluster manager to:

receive Layer 1 (L1)/Layer 2 (L2) measurements of the terminal device on the radio node and one or more neighboring radio nodes of the radio node, determine a target radio node, to which the terminal device is to be handed over, based on the L1/L2 measurements, determine whether the target radio node is within the cluster, and determine, if it is determined that the target radio node is within the cluster, whether the terminal device is to perform handover from a beam of the radio node to a beam of the target radio node.

7. The cluster manager according to claim 6, wherein the instructions further cause said cluster manager to: convert, if it is determined that the target radio node is outside the cluster, the L1/L2 measurements to Layer 3 (L3) measurements; and transmit the L3 measurements to the control node for determining whether the terminal device is to perform handover from the radio node to the target radio node.

8. The cluster manager according to claim 6, wherein the instructions further cause said cluster manager to: update, before determining whether the target radio node is within the cluster, the cluster based on the L1/L2 measurements.

9. The cluster manager according to claim 8, wherein to update includes: to convert the L1 L2 measurements to Layer 3 (L2) measurements; to determine that one or more radio nodes outside the cluster have been measured as having a signal quality above a first predefined threshold, based on the L3 measurements; and to add the one or more radio node into the cluster.

10. The cluster manager according to claim 8, wherein to update includes: to convert the L1; L2 measurements to Layer 3 (L3) measurements; to determine that one or more radio nodes within the cluster have been measured as having a signal quality below a second predefined threshold, based on the L3 measurements; and to remove the detected one or more radio nodes from the cluster.

* * * * *